US012671911B2

(12) United States Patent
Matsumoto et al.

(10) Patent No.: US 12,671,911 B2
(45) Date of Patent: Jun. 30, 2026

(54) IMAGE PROCESSING DEVICE, IMAGE PROCESSING METHOD, IMAGING DEVICE, AND RECORDING MEDIUM

(71) Applicant: CANON KABUSHIKI KAISHA, Tokyo (JP)

(72) Inventors: Toru Matsumoto, Kanagawa (JP); Masafumi Kimura, Kanagawa (JP); Kyosuke Sato, Kanagawa (JP); Ryuichiro Yasuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 18/676,677

(22) Filed: May 29, 2024

(65) Prior Publication Data

US 2024/0314451 A1    Sep. 19, 2024

Related U.S. Application Data

(63) Continuation of application No. PCT/JP2022/043593, filed on Nov. 25, 2022.

(30) Foreign Application Priority Data

Dec. 13, 2021    (JP) ................................. 2021-201737

(51) Int. Cl.
  *H04N 23/76*    (2023.01)
  *H04N 23/667*    (2023.01)
  *H04N 23/71*    (2023.01)

(52) U.S. Cl.
  CPC ........... *H04N 23/76* (2023.01); *H04N 23/667* (2023.01); *H04N 23/71* (2023.01)

(58) Field of Classification Search
  CPC ...... H04N 23/76; H04N 23/667; H04N 23/71; H04N 23/60; H04N 23/95; G03B 7/0997; G03B 5/00
  See application file for complete search history.

(56) References Cited

U.S. PATENT DOCUMENTS

| | | | | |
|---|---|---|---|---|
| 2015/0334283 A1* | 11/2015 | Vranceanu | ................ | G06T 5/40 |
| | | | | 348/239 |
| 2020/0162673 A1* | 5/2020 | Kanda | .................. | H04N 25/778 |
| 2021/0203827 A1* | 7/2021 | Frevert | ................ | H04N 23/811 |

FOREIGN PATENT DOCUMENTS

| | | | | | |
|---|---|---|---|---|---|
| CN | 112567728 A | * | 3/2021 | ............. | G06V 20/10 |
| JP | 2009177250 A | | 8/2009 | | |
| JP | 4390274 B2 | | 12/2009 | | |
| JP | 2013093786 A | * | 5/2013 | | |
| JP | 2017005539 A | | 1/2017 | | |

(Continued)

*Primary Examiner* — Lin Ye
*Assistant Examiner* — Steven Daniel Barry
(74) *Attorney, Agent, or Firm* — Cowan, Liebowitz & Latman, P.C.

(57)    ABSTRACT

An image processing device comprising: a memory storing instructions; and a processor executing the instructions causing the image processing device to: acquire outside information; acquire luminance information of an image; combine a plurality of images and to generate a combined image; perform a process of outputting the acquired image or the combined image; and start a process of generating the combined image in response to acquisition of the outside information, and perform a process of outputting an uncombined image not combined or the combined image on the basis of the luminance information.

6 Claims, 12 Drawing Sheets

(56)  References Cited

FOREIGN PATENT DOCUMENTS

| JP | 2018007077 | A |   | 1/2018 |  |  |
|----|------------|---|---|--------|--|--|
| JP | 6545229 | B2 | * | 7/2019 | ........... | H04N 23/698 |
| JP | 2021101494 | A | * | 7/2021 | ............. | H04N 23/60 |
| WO | WO-2021245935 | A1 | * | 12/2021 | ............. | H04N 23/60 |

* cited by examiner

FIG. 6

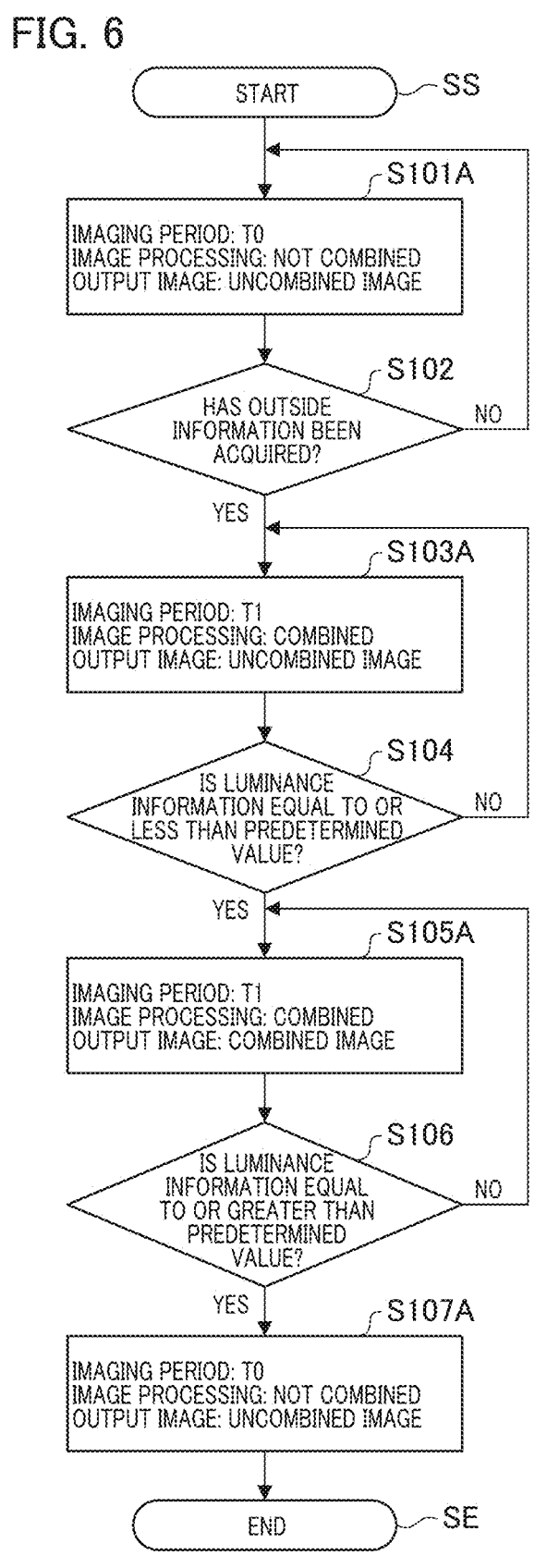

START ⌒ SS

S101A

IMAGING PERIOD: T0
IMAGE PROCESSING: NOT COMBINED
OUTPUT IMAGE: UNCOMBINED IMAGE

S102

HAS OUTSIDE INFORMATION BEEN ACQUIRED?   NO

YES

S103A

IMAGING PERIOD: T1
IMAGE PROCESSING: COMBINED
OUTPUT IMAGE: UNCOMBINED IMAGE

S104

IS LUMINANCE INFORMATION EQUAL TO OR LESS THAN PREDETERMINED VALUE?   NO

YES

S105A

IMAGING PERIOD: T1
IMAGE PROCESSING: COMBINED
OUTPUT IMAGE: COMBINED IMAGE

S106

IS LUMINANCE INFORMATION EQUAL TO OR GREATER THAN PREDETERMINED VALUE?   NO

YES

S107A

IMAGING PERIOD: T0
IMAGE PROCESSING: NOT COMBINED
OUTPUT IMAGE: UNCOMBINED IMAGE

END ⌒ SE

IMAGE PROCESSING DEVICE, IMAGE PROCESSING METHOD, IMAGING DEVICE, AND RECORDING MEDIUM

CROSS-REFERENCE TO RELATED APPLICATIONS

This application is a Continuation of International Patent Application No. PCT/JP2022/43593, filed Nov. 25, 2022, which claims the benefit of Japanese Patent Application No. 2021-201737, filed Dec. 13, 2021, both of which are hereby incorporated by reference herein in their entirety.

BACKGROUND OF THE INVENTION

Field of the Invention

The present invention relates to a technique of processing combination of a plurality of images.

Background Art

When imaging of a subject is performed using an imaging device, imaging conditions are determined on the basis of photometry information and an imaging operation is performed. Patent Literature 1 discloses a technique of performing image combination when the luminance of a subject is equal to or less than a predetermined value. It is possible to capture a moving image with a smooth motion at a low cost while correcting camera shake using an electronic image segmentation system when a subject with low luminance/low illuminance is imaged.

CITATION LIST

Patent Literature

Patent Literature 1 Japanese Patent No. 4390274

In the technique disclosed in Patent Literature 1, when image combination is started after the luminance becomes equal to or less than the predetermined value and a long time is taken for image processing, a combined image is output with a delay with respect to a change in luminance. For example, in an application to an onboard camera, there is a likelihood that an image from which a subject cannot be recognized due to a phenomenon called blackening or halation will be temporarily output at a place with a great change in luminance such as an entrance/exit of a tunnel.

SUMMARY OF THE INVENTION

The present invention provides an image processing device, an image processing method, an imaging device, and a recording medium that allow a recognizable image to be more rapidly output with respect to a change in luminance.

An image processing device according to an embodiment of the present disclosure comprises a memory storing instructions, and a processor executing the instructions causing the image processing device to acquire outside information, acquire luminance information of an image, combine a plurality of images and to generate a combined image, perform a process of outputting the acquired image or the combined image, and start a process of generating the combined image in response to acquisition of the outside information, and perform a process of outputting an uncombined image not combined or the combined image on the basis of the luminance information.

Further features of the present invention will become apparent from the following description of exemplary embodiments with reference to the attached drawings.

BRIEF DESCRIPTION OF THE DRAWINGS

FIG. 6 is a flowchart illustrating a process flow according to Modified Example 4 of the first embodiment.

DESCRIPTION OF THE EMBODIMENTS

Hereinafter, exemplary embodiments of the present invention will be described in detail with reference to the accompanying drawings. In the embodiments, application examples with respect to an image processing device and an imaging device that can acquire outside information and perform a process of outputting a recognizable image with respect to a change in luminance will be described.

First Embodiment

Figure 1:
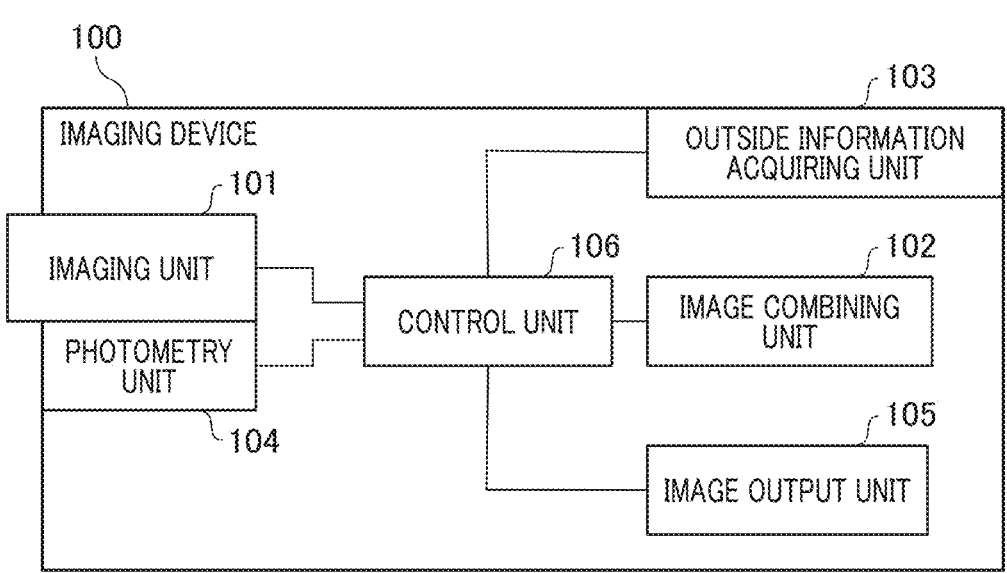
FIG. 1 is a block diagram illustrating a configuration of an imaging device according to a first embodiment.

A camera that is mounted in a mobile object such as a vehicle will be exemplified as an imaging device according to a first embodiment. FIG. 1 is a block diagram illustrating a configuration of an imaging device 100. The imaging device 100 includes an imaging unit 101, an image combining unit 102, an outside information acquiring unit 103, a photometry unit 104, an image output unit 105, and a control unit 106.

The imaging unit 101 includes an imaging element and acquires an image of a subject. The image combining unit 102 combines a plurality of images acquired by the imaging unit 101 and generates a combined image. An image combining method is arbitrary and can employ any known method. For example, an image combining method using addition can be employed. In the image combining method using addition, a method of adding all images at a fixed combination proportion, a method of adding images at different combination proportions according to segments of the images, a method of adding different numbers of images to be combined according to segments of the images, and the like can be employed.

The outside information acquiring unit 103 acquires outside information through wireless communication or wired communication with an external device. For example, the outside information is as follows.

Position information of a mobile object acquired by a global positioning system (GPS), a wireless local area network (LAN), or the like Map information acquired by a navigation system or Internet communication.

Road information or identification information acquired from a beacon or the like.

Distance measurement information or identification acquired by a device mounted in a mobile object such as a light detection and ranging (LiDAR) device or an ultrasonic sensor.

Angular velocity information, acceleration information, travel distance information, photometry information, or the like from sensors provided in a mobile object.

The outside information acquiring unit 103 outputs the acquired outside information to the control unit 106.

The photometry unit 104 measures luminance information of an imaging area associated with the imaging unit 101. Data of the measurement results is output from the photometry unit 104 to the control unit 106.

The image output unit 105 performs a process of outputting an image not combined (hereinafter referred to as an uncombined image) acquired by the imaging unit 101 or a combined image combined by the image combining unit 102. The uncombined image or the combined image is subjected to a process of being displayed on a display unit, a process of being recorded on a recording medium, or a process of being output to an external device.

The control unit 106 includes, for example, a central processing unit (CPU) and comprehensively controls the constituents of the imaging device 100. The control unit 106 controls the imaging unit 101, the image combining unit 102, and the image output unit 105 on the basis of the outside information acquired by the outside information acquiring unit 103 and the luminance information measured by the photometry unit 104.

Figure 2:
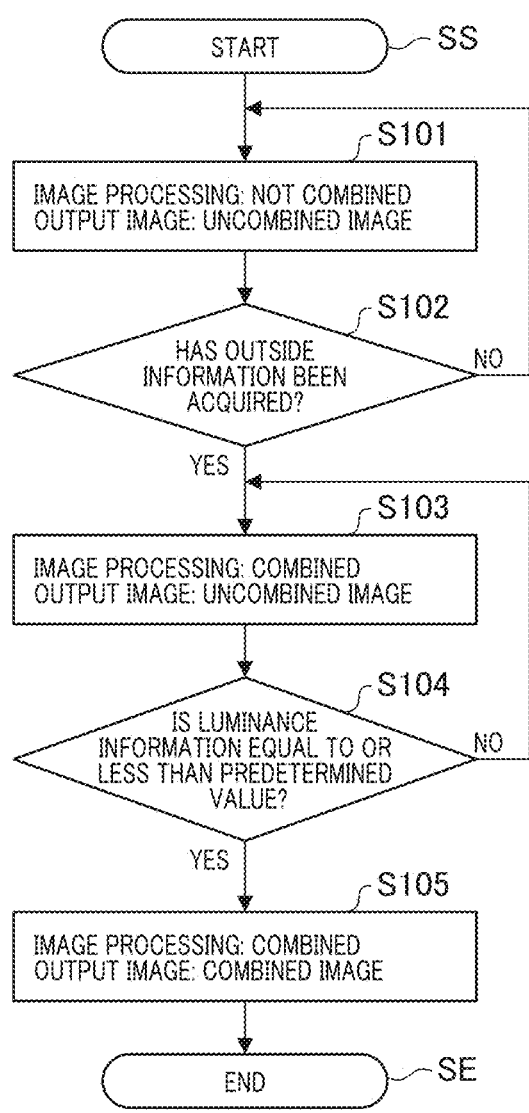
FIG. 2 is a flowchart illustrating a process flow according to the first embodiment.

FIG. 2 is a flowchart illustrating a process flow according to this embodiment. It is assumed that a vehicle having the imaging device 100 mounted therein is traveling on a road, enters a place at which a luminance changes greatly such as a tunnel, and exits the place. This embodiment is not limited to traveling in a tunnel and can be applied to a mobile object entering and exiting a place with a great change in luminance, for example, a building. The process flow starts in SS and ends in SE.

In S101, the imaging unit 101 acquires an image through imaging. In this case, the image combining unit 102 does not perform a combination process on the acquired image. The image output unit 105 performs a process of outputting the image acquired by the imaging unit 101 and not subjected to the combination process. For example, the vehicle having the imaging device 100 mounted thereon is traveling on a road before entering a tunnel in the daytime, and the imaging unit 101 performs a process of imaging an external environment. At this time, the imaging unit 101 is subjected to exposure control based on an external environment, and an exposure time is set to, for example, less than $\frac{1}{30}$ seconds. In a period in which the subsequent processes of S102 to S107 are performed, the exposure time is set to be less than $\frac{1}{30}$ seconds such that an imaging period of the image acquired by the imaging unit 101 is not greater than a predetermined value (for example, a value corresponding to 30 fps). Then, the process flow proceeds to S102.

In S102, the control unit 106 determines whether predetermined outside information (hereinafter referred to as first outside information) has been acquired by the outside information acquiring unit 103. The first outside information is information for determining that the position is close to, for example, an entrance of a tunnel using position information of the mobile object, map information, road information, identification information, distance measurement information, or the like. When it is determined that the outside information acquiring unit 103 has acquired the first outside information, the process flow proceeds to S103. When it is determined that the outside information acquiring unit 103 has not acquired the first outside information, the process flow proceeds to S101.

In S103, the image combining unit 102 starts the process of generating a combined image. The process of generating a combined image is performed on the basis of predetermined combination conditions (a combination ratio or the number of combined images). For example, the combined image is generated such that the luminance of a low-luminance part in an uncombined image is higher than that before combination. In S103, the image output unit 105 performs a process of outputting the uncombined image acquired by the imaging unit 101. Then, the process flow proceeds to S104.

In S104, the control unit 106 compares a value of luminance information measured by the photometry unit 104 with a predetermined value. The predetermined value is a first threshold value of luminance information and is set to, for example, a value enabling a great decrease in luminance at an entrance of a tunnel to be detected. When it is determined that the value of luminance information is equal to or less than the predetermined value, the process flow proceeds to S105. When it is determined that the value of luminance information is greater than the predetermined value, the process flow proceeds to S103.

In S105, the control unit 106 performs a process of switching the uncombined image output by the image output unit 105 to the combined image which is generated by the image combining unit 102 of which generation has been started in S103. In this embodiment, the image combining unit 102 starts the combination process at a time point at which the first outside information is acquired before a time point at which the value of luminance information becomes equal to or less than the predetermined value. In comparison with a case in which the combined image generating process is started at the time point at which the value of luminance information becomes equal to or less than the predetermined value and the combined image is output, a recognizable combined image can be output without a delay after the value of the luminance information has become equal to or less than the predetermined value. For example, an image without blackening can be output when the mobile object enters a tunnel. In the daytime, an external environment may be brighter than the inside of a tunnel and the luminance may decrease greatly at an entrance of the tunnel. In the nighttime, the inside of a tunnel may be brighter than an external environment, and luminance at an exit of the tunnel may decrease greatly. In consideration of such cases, the processes of S101 to S104 may be performed in the tunnel, and information enabling determination of the vicinity of the exit of the tunnel in S102 may be acquired.

According to this embodiment, the image combining unit 102 can start the combined image generating process in response to acquisition of the outside information and more rapidly output a recognizable image with change in luminance.

Modified examples of this embodiment will be described below. In a plurality of modified examples described below and embodiments described later, description of the same details as in the first embodiment and constituents corresponding to the first embodiment will be omitted, and differences therefrom will be mainly described.

Modified Example 1 of First Embodiment

Figure 3:
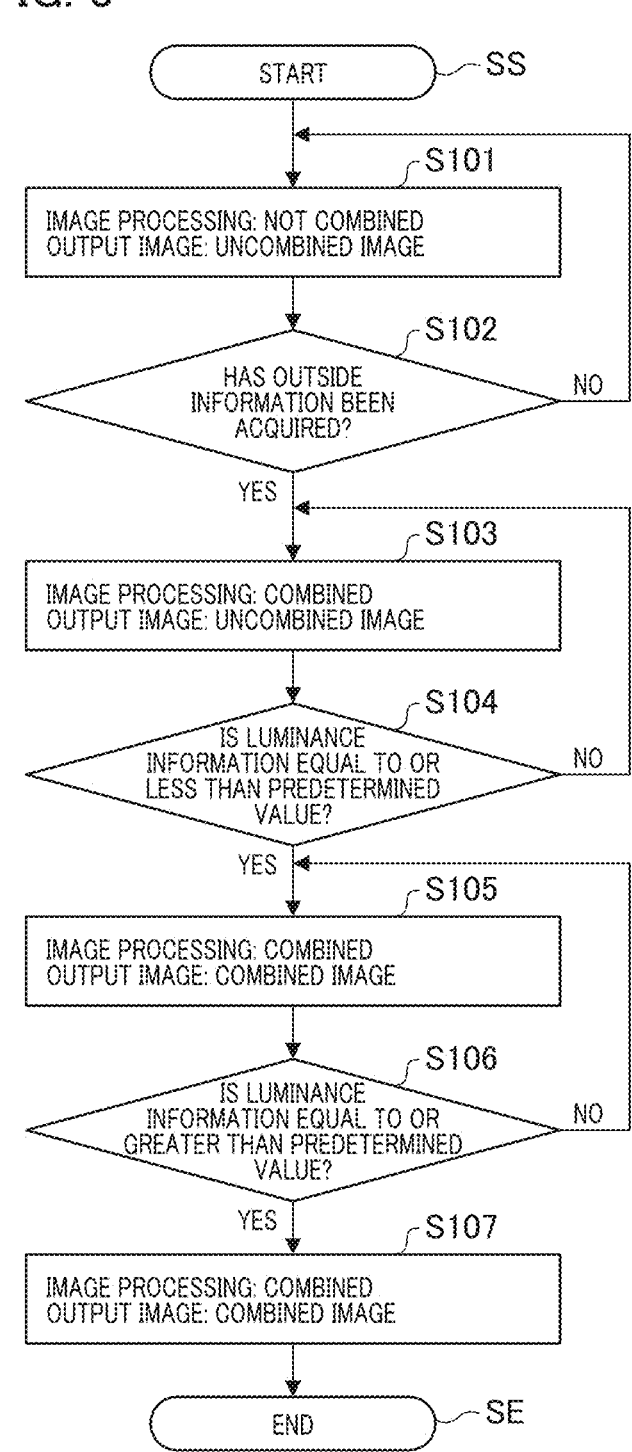
FIG. 3 is a flowchart illustrating a process flow according to Modified Example 1 of the first embodiment.

A process flow according to Modified Example 1 of the first embodiment will be described below with reference to FIG. 3. FIG. 3 is a flowchart in which a process example at an exit of a tunnel is added to the flowchart illustrated in FIG. 2 (a process example at an entrance of a tunnel) and the processes of S106 and S107 are added. The process flow proceeds to S106 after S105. Setting such as exposure control in the imaging process performed by the imaging unit 101 is the same as in the first embodiment, and this is true of other modified examples unless otherwise mentioned.

In S106, the control unit 106 compares a value of luminance information measured by the photometry unit 104 with a predetermined value. The predetermined value is a second threshold value associated with the luminance information and is set to a value enabling detection of a great increase in luminance at an exit of a tunnel. When it is determined that the value of luminance information is equal to or greater than the predetermined value (equal to or greater than the threshold value), the process flow proceeds to S107. When it is determined that the value of luminance information is less than the predetermined value, the process flow proceeds to S105.

In S107, the control unit 106 performs a process of switching a combined image to an uncombined image. The image combining unit 102 stops the combined image generating process. The image output unit 105 performs an uncombined image outputting process.

According to this modified example, when a change in luminance is detected and an exit of a tunnel is recognized, the combined image can be immediately switched to the uncombined image and the uncombined image can be output. Accordingly, it is possible to output an image without halation.

Modified Example 2 of First Embodiment

Figure 4:
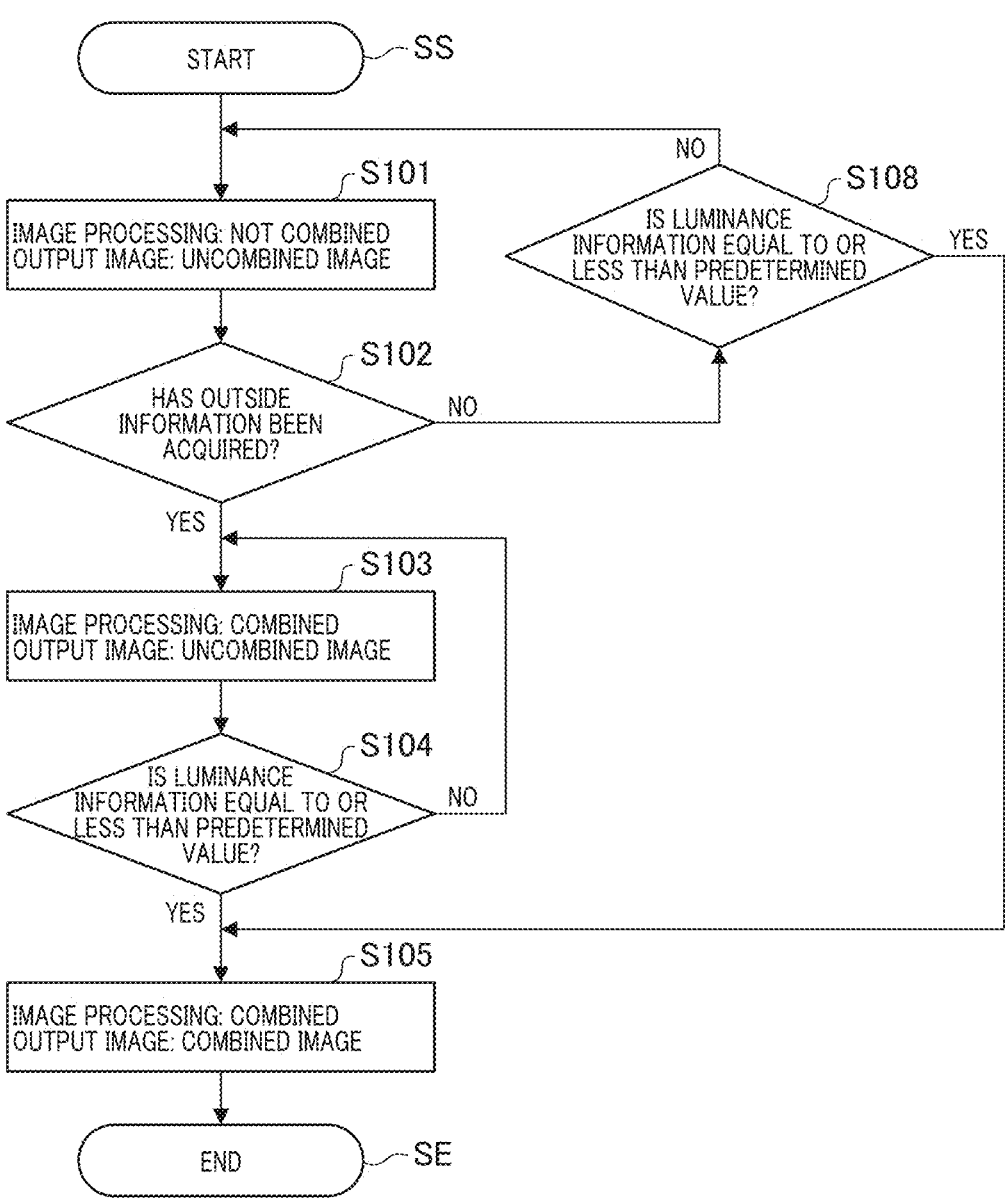
FIG. 4 is a flowchart illustrating a process flow according to Modified Example 2 of the first embodiment.

FIG. 4 is a flowchart illustrating a process flow according to Modified Example 2 of the first embodiment. In this modified example, it is assumed that the outside information acquiring unit 103 has not acquired first outside information and the vehicle has entered a tunnel. In FIG. 4, the process of S108 is added to those in FIG. 2.

When the process flow proceeds from S101 to S102 and it is determined that the first outside information has not been acquired, the process flow proceeds to S108. In S108, the control unit 106 compares a value of luminance information measured by the photometry unit 104 with a predetermined value. In this case, the predetermined value is the first threshold value mentioned in S104.

When it is determined in S108 that the value of luminance information is equal to or less than the predetermined value (equal to or less than the threshold value), the process flow proceeds to S105. In this case, the image combining unit 102 immediately starts the image combining process, and the image output unit 105 performs the combined image outputting process. When it is determined in S108 that the value of luminance information is greater than the predetermined value, the process flow proceeds to S101.

According to this modified example, when the outside information acquiring unit 103 has not acquired the first outside information, comparison with a threshold value is performed with reference to luminance information. When it is determined that the vehicle is in a tunnel, it is possible to output the combined image. It is assumed that the outside information acquiring unit 103 has acquired the first outside information indicating that the vehicle is at an entrance of a tunnel in the tunnel after the combined image has been output. In this case, the image combining unit 102 continues to perform the combined image generating process, and the image output unit 105 continues to perform the combined image outputting process.

Modified Example 3 of First Embodiment

Figure 5:
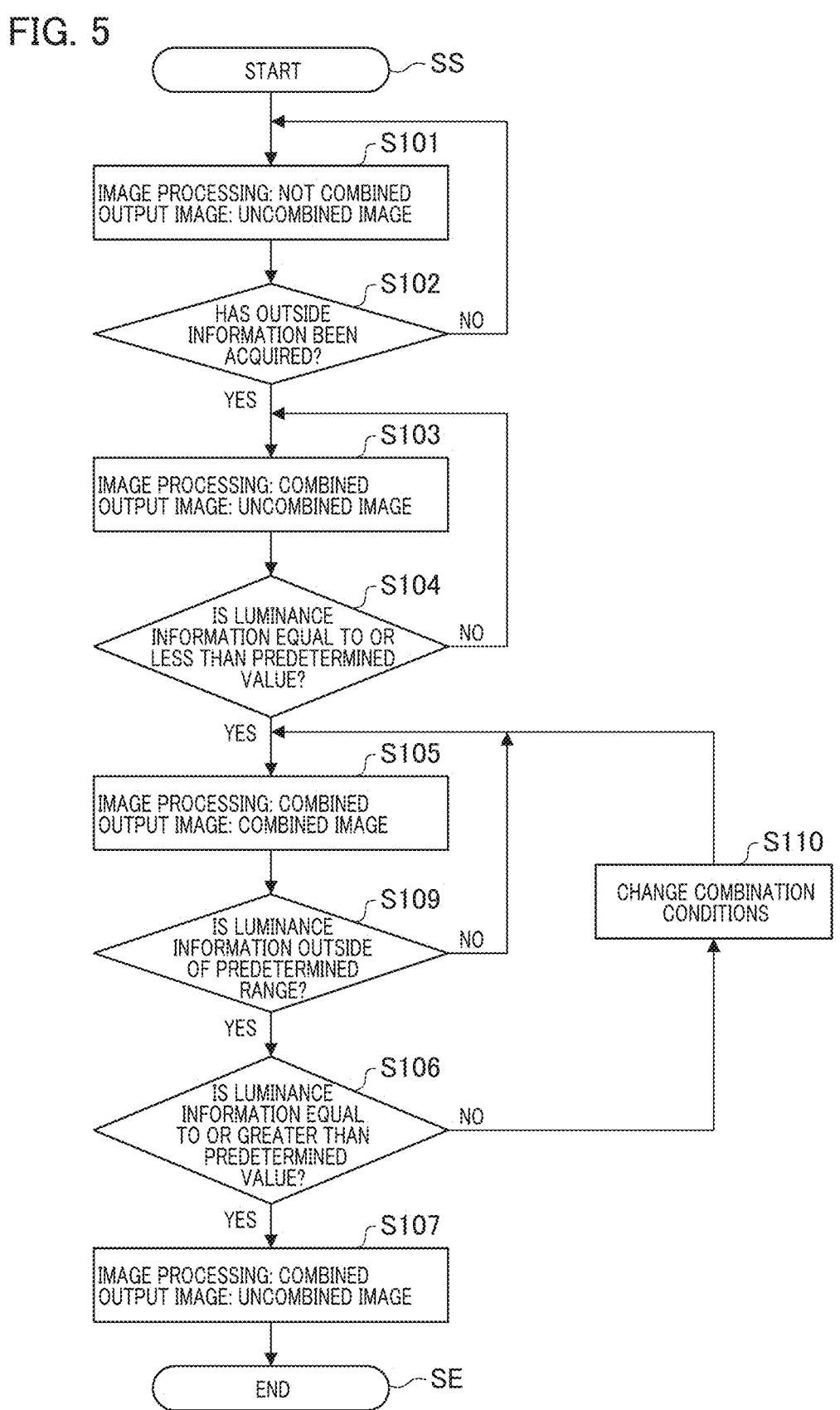
FIG. 5 is a flowchart illustrating a process flow according to Modified Example 3 of the first embodiment.

FIG. 5 is a flowchart illustrating a process flow according to Modified Example 3 of the first embodiment. In this modified example, it is assumed that luminance information in a tunnel changes when a combined image is output while a vehicle is traveling in the tunnel. In FIG. 5, the processes of S106, S107, S109, and S110 are added to those in FIG. 2.

After the combined image has been output in S105, the process flow proceeds to S109. In S109, the control unit 106 determines whether the luminance information measured by the photometry unit 104 is outside of a predetermined range. When "luminance information is outside of a predetermined range," the predetermined range means a range of luminance information in which a combined image of which an exposure intensity is not appropriate and in which halation or blackening is not generated is generated through the process of the image combining unit 102 in S105. The process flow proceeds to S106 when it is determined that the luminance information is outside of the predetermined range, and the process flow proceeds to S105 when it is determined that the luminance information is not outside of the predetermined range.

The process of S106 is the same as described above with reference to FIG. 3. When the control unit 106 determines that the value of luminance information measured by the photometry unit 104 is equal to or greater than the predetermined value, the process flow proceeds to S107. When it is determined that the value of luminance information measured by the photometry unit 104 is less than the predetermined value, the process flow proceeds to S110.

The process of S107 is the same as described above with reference to FIG. 3. The image combining unit 102 stops the combined image generating process, and the image output unit 105 performs the uncombined image outputting process. After S107, the process flow ends.

When exposure of the combined image is not appropriate in a tunnel, the process flow proceeds from S106 to S110. In S110, the control unit 106 changes settings of the number of images combined by the image combining unit 102 according to the luminance information in S109 such that an image with an appropriate exposure intensity can be combined. After combination conditions in the image combining unit 102 have been changed in S110, the process flow proceeds to S105. In S105, a combined image is generated under the combination conditions changed in S110, and the combined image is output.

According to this modified example, when luminance information changes after a combined image has been output, it is possible to output a combined image based on the changed luminance information.

Modified Example 4 of First Embodiment

FIG. 6 is a flowchart illustrating a process flow according to Modified Example 4 of the first embodiment. In this modified example, it is assumed that an imaging period in the imaging unit 101 can be changed when the outside information acquiring unit 103 has acquired first outside information. In FIG. 6, the processes of S101A, S103A, S105A, and S107A of which details are different from those in the example illustrated in FIG. 3 will be mainly described.

In S101A, the imaging unit 101 performs imaging with a normal imaging period (hereinafter referred to as T0). The image combining unit 102 does not perform a process of generating a combined image, and the image output unit 105 performs a process of outputting an uncombined image captured in the imaging period T0.

When it is determined in S102 that the outside information acquiring unit 103 has not acquired the first outside information, the process flow proceeds to S101A. When it is determined in S102 that the outside information acquiring unit 103 has acquired the first outside information, the process flow proceeds to S103A.

In S103A, the imaging unit 101 performs imaging with an imaging period (hereinafter referred to as T1) shorter than the normal imaging period T0. Changing and setting of the imaging period are performed by the control unit 106. The image combining unit 102 starts the process of generating a combined image using an image captured with the imaging period T1. The image output unit 105 performs the process of outputting the image (an uncombined image) acquired by the imaging unit 101. The process flow proceeds to S105A when it is determined in S104 that the value of luminance information measured by the photometry unit 104 is equal to or less than the predetermined value, and the process flow proceeds to S103A when it is determined that the value of luminance information is not equal to or less than the predetermined value.

In S105A, the imaging period is T1, and the image combining unit 102 continues to perform the process of generating a combined image. The image output unit 105 switches the uncombined image to the combined image generated by the image combining unit 102 and performs the process of outputting the combined image.

When the measurement result of the photometry unit 104 changes and thus it is determined in S106 that the value of luminance information is equal to or greater than the predetermined value, the process flow proceeds to S107A. When it is determined that the value of luminance information is less than the predetermined value, the process flow proceeds to S105A.

In S107A, the control unit 106 performs a process of returning the imaging period T1 to the normal imaging period T0. The image combining unit 102 stops the process of generating a combined image. The image output unit 105 switches the combined image to the uncombined image and performs the process of outputting the uncombined image.

According to this modified example, by changing the imaging period in the imaging unit 101 in response to acquisition of outside information, it is possible to output a recognizable image without a delay with respect to a change in luminance.

An image combining method that is performed by the image combining unit 102 will be described below. When a method of adding a plurality of images is used and image blurring occurs between images, there is a likelihood that blurring will occur in a combined image through simple addition. In order to correct blurring between images, the outside information acquiring unit 103 can acquire second outside information. The second outside information is detection information from an angular velocity sensor, an acceleration sensor, or the like associated with a device in which the imaging device 100 is provided. The second outside information can be acquired and used to correct blurring between images. As the second outside information, detection information from an angular velocity sensor or an acceleration sensor provided in the imaging device 100 can be acquired and used to correct blurring between images.

As another method, a method of detecting a motion vector which is acquired from a plurality of images with different imaging times can be used. As the second outside information, a motion vector can be acquired and used to correct blurring between images. A configuration of an imaging device 100C will be described below with reference to FIG. 7.

Figure 7:
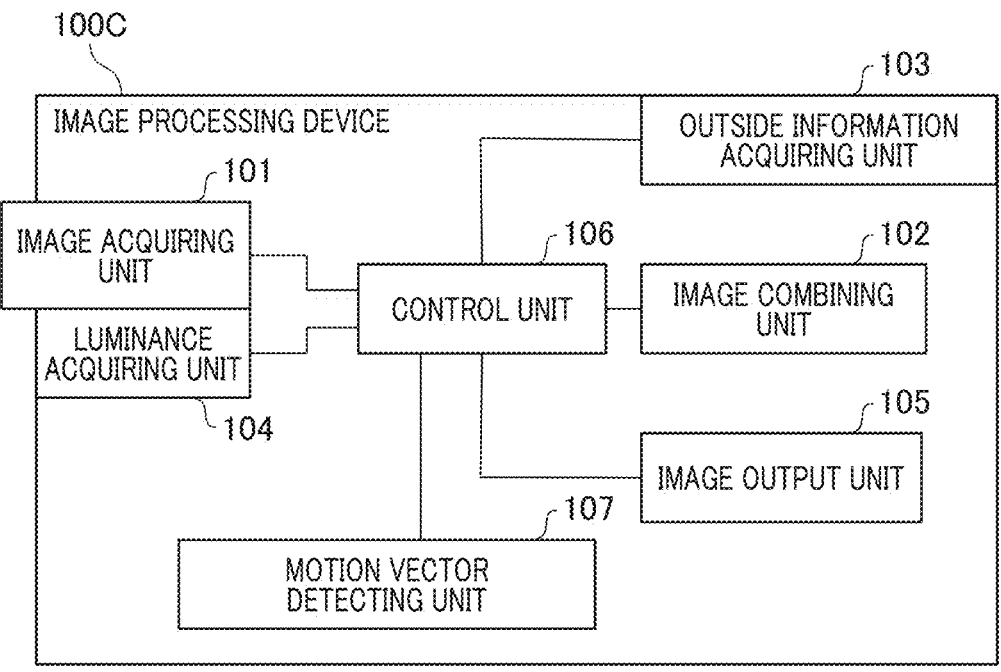
FIG. 7 is a block diagram illustrating another example of the configuration of the imaging device according to the first embodiment.

FIG. 7 is a block diagram illustrating an example of the configuration of the imaging device 100C. FIG. 7 is different from FIG. 1 in that a motion vector detecting unit 107 is provided. The motion vector detecting unit 107 detects a motion vector in a captured image and outputs the detected motion vector to the control unit 106. Since blurring between images can be corrected by aligning a plurality of images using the detected motion vectors at the time of combination of images, it is possible to curb blurring in a combined image.

Blurring between images can be corrected using the detection information from the angular velocity sensor or the acceleration sensor and the motion vectors together as the second outside information. This is similarly applicable to embodiments and modified examples which will be described later.

Second Embodiment

Figure 8:
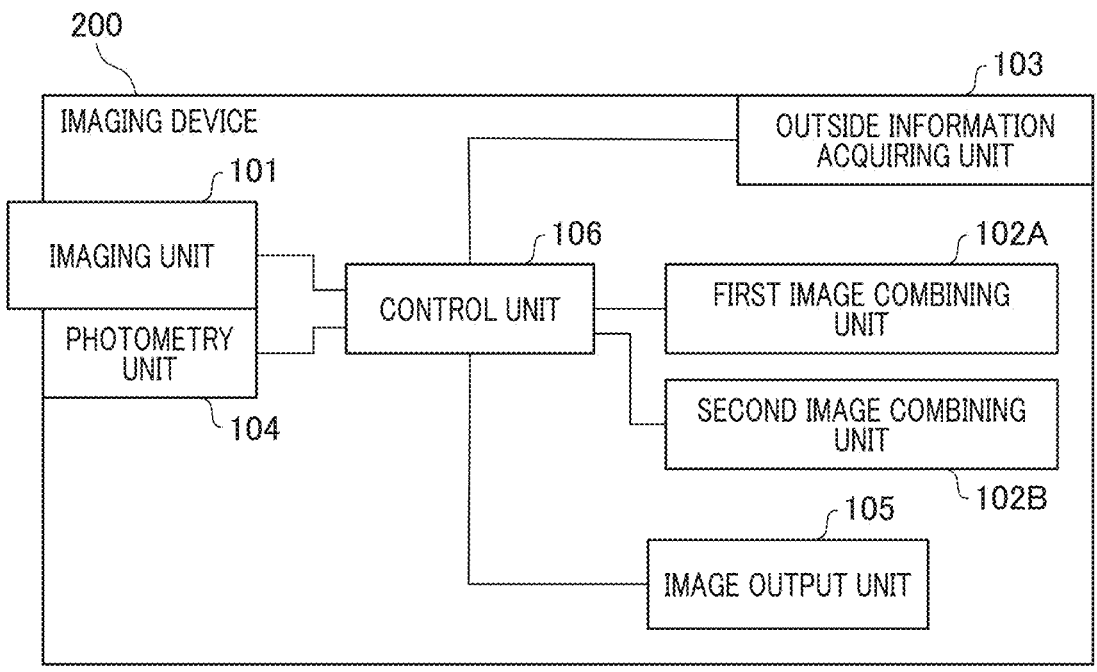
FIG. 8 is a block diagram illustrating a configuration of an imaging device according to a second embodiment.

A second embodiment will be described below with reference to FIGS. 8 to 10. FIG. 8 is a block diagram illustrating a configuration of an imaging device 200 according to this embodiment. This configuration is different from the configuration of the imaging device 100 according to the first embodiment in that the imaging device 200 includes a plurality of image combining units. In the following configuration, it is assumed that the imaging device 200 includes a first image combining unit 102A and a second image combining unit 102B with different numbers of combined images.

Figure 9:
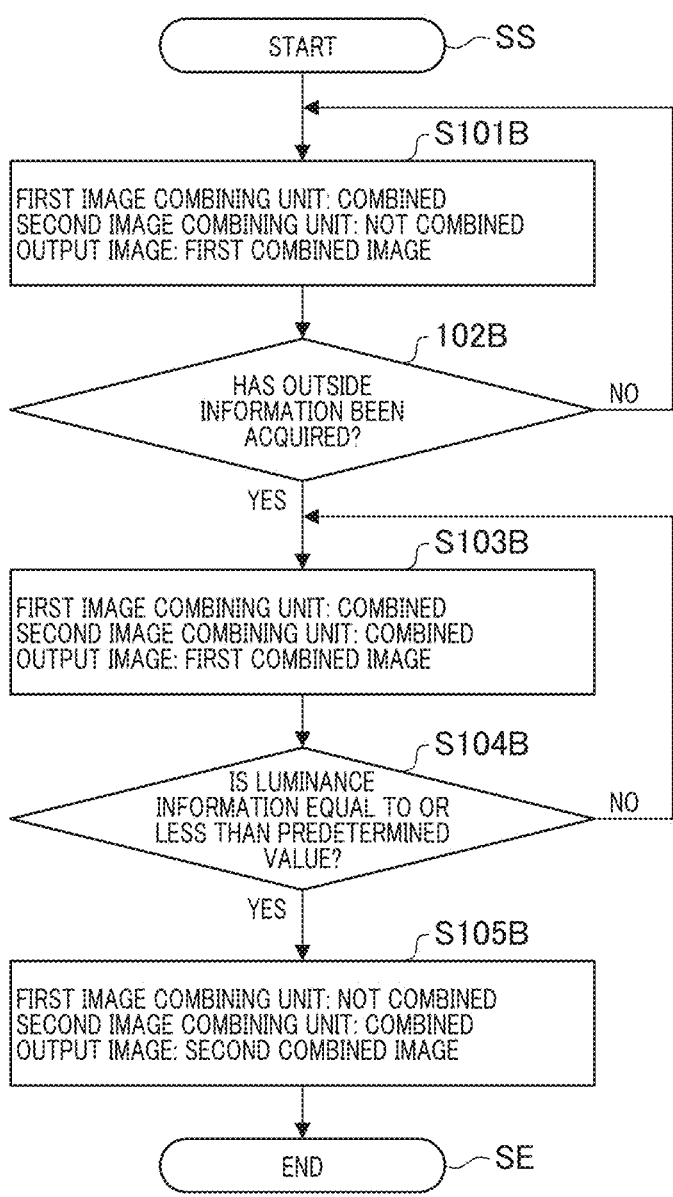
FIG. 9 is a flowchart illustrating a process flow according to the second embodiment.
Figure 10:
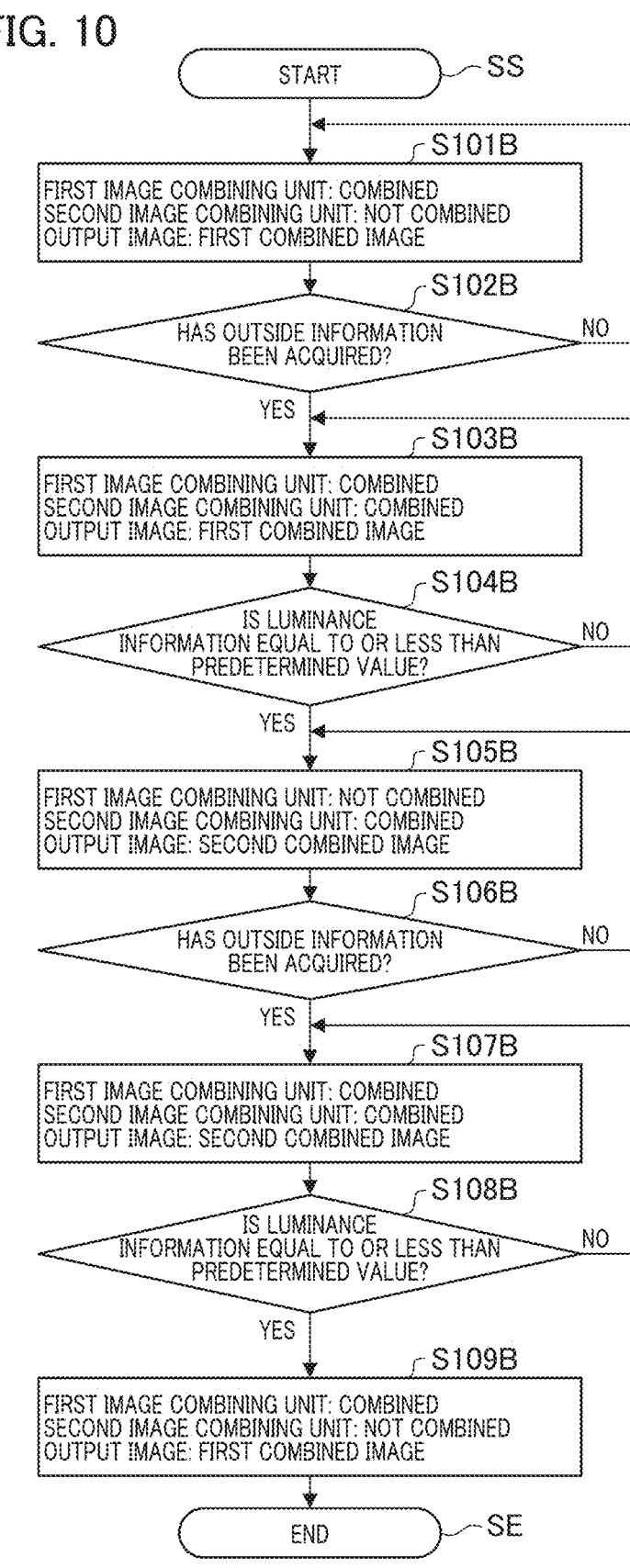
FIG. 10 is a flowchart illustrating a process flow according to a modified example of the second embodiment.

FIG. 9 is a flowchart illustrating a process flow according to this embodiment. In S101B, the first image combining unit 102A generates a first combined image using images acquired by the imaging unit 101. The second image combining unit 102B does not perform a combination process and thus a second combined image is not generated. The image output unit 105 performs a process of outputting the first combined image. Then, the process flow proceeds to S102B.

In S102B, the control unit 106 determines whether the outside information acquiring unit 103 has acquired first outside information. When it is determined that the outside information acquiring unit 103 has acquired first outside information, the process flow proceeds to S103B. When it is determined that the outside information acquiring unit 103 has not acquired first outside information, the process flow proceeds to S101B.

In S103B, the first image combining unit 102A performs a process of generating a first combined image. The second image combining unit 102B starts a process of generating a second combined image using images acquired by the imaging unit 101. At this time, the image output unit 105 performs the process of outputting the first combined image. Then, the process flow proceeds to S104B.

In S104B, the control unit 106 compares the value of luminance information measured by the photometry unit 104 with a predetermined value (a first threshold value). When it is determined that the value of luminance information is equal to or less than the predetermined value, the process flow proceeds to S105B. When it is determined that the value of luminance information is greater than the predetermined value, the process flow proceeds to S103B.

In S105B, the first image combining unit 102A stops the process of generating a first combined image, and the second image combining unit 102B performs the process of generating a second combined image. The image output unit 105 switches the first combined image to the second combined image and performs the process of outputting the second combined image. The number of combined images in the second image combining unit 102B is set to be larger than the number of combined images in the first image combining unit 102A. Accordingly, it is possible to generate a recognizable combined image even in a situation of a darker surrounding environment.

In this embodiment, it is possible to output a recognizable image without a delay with respect to a change in luminance by using a plurality of image combining units with different numbers of combined images. The configuration including two image combining units is an example, and this embodiment is applicable to a configuration including three or more image combining units with different combination conditions such as the number of combined images.

Modified Example of Second Embodiment

A process flow according to a modified example of the second embodiment will be described below with reference to FIG. 10. FIG. 10 is a flowchart in which a process example at an exit of a tunnel is added to the flowchart illustrated in FIG. 9 (a process example at an entrance of a tunnel) and the processes of S106B to 109B are added. In S105B, a second combined image in the tunnel is being output as described above. Then, the process flow proceeds to S106B.

In S106B, the control unit 106 determines whether the outside information acquiring unit 103 has acquired third outside information. The third outside information is, for example, information for identifying the vicinity of an exit of a tunnel which is emitted from a beacon provided at an exit of the tunnel. Alternatively, detection information from an acceleration sensor, an angular velocity sensor and map information (GPS information) of a surrounding environment of a mobile object, or the like may be used as the third outside information. By acquiring the third outside information, it is possible to determine whether a vehicle approaches a specific place such as an exit of a tunnel. When it is determined in S106B that the outside information acquiring unit 103 has acquired the third outside information, the process flow proceeds to S107B. When it is determined that the outside information acquiring unit 103 has not acquired the third outside information, the process flow proceeds to S105B.

In S107B, both the first image combining unit 102A and the second image combining unit 102B perform a combined image generating process. When it is determined that the vehicle approaches an exit of a tunnel through acquisition of the third outside information, the first image combining unit 102A restarts the process of generating a first combined image. At this time, the image output unit 105 performs the process of outputting a second combined image. Then, the process flow proceeds to S108B.

In S108B, the control unit 106 compares the value of luminance information measured by the photometry unit 104 with a predetermined value (a second threshold value). The process flow proceeds to S109B when it is determined that the value of luminance information is equal to or greater than the predetermined value, and the process flow proceeds to S107B when it is determined that the value of luminance information is less than the predetermined value.

When the process flow proceeds from S108B to S109B, it is detected that the vehicle has exited the tunnel. In S109B, the first image combining unit 102A continues to perform the process of generating a first combined image, and the second image combining unit 102B stops the process of generating a second combined image. The image output unit 105 switches the second combined image to the first combined image and performs the process of outputting the first combined image.

According to this embodiment, it is possible to output a recognizable image without a delay with respect to a change in luminance at an entrance and an exit of a tunnel or the like.

Third Embodiment

Figure 11:
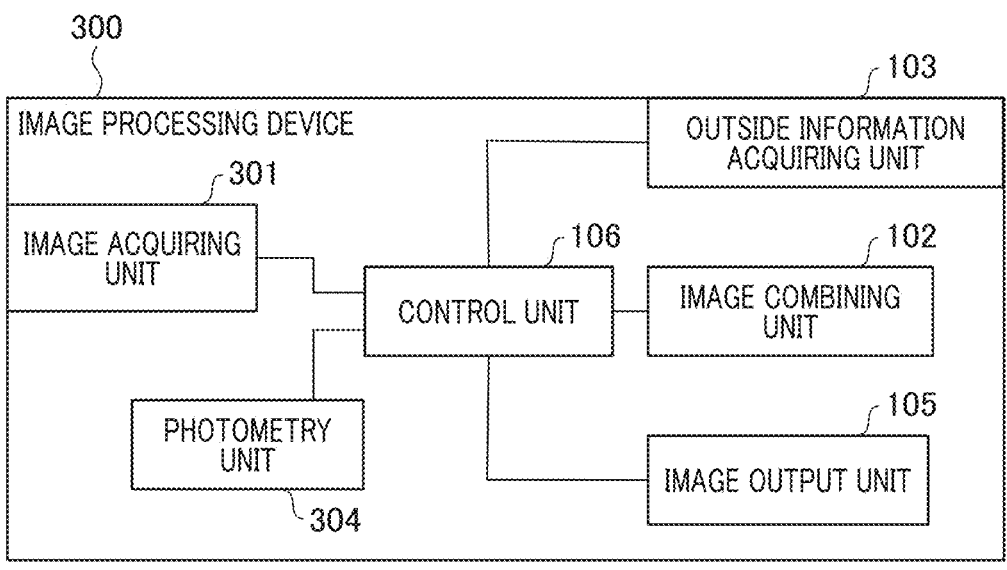
FIG. 11 is a block diagram illustrating a configuration of an image processing device according to a third embodiment.

A third embodiment will be described below with reference to FIGS. 11 and 12. FIG. 11 is a block diagram illustrating an example of a configuration of an image processing device 300 according to this embodiment. The image processing device 300 includes an image acquiring unit 301, an image combining unit 102, an outside information acquiring unit 103, a luminance acquiring unit 304, an image output unit 105, and a control unit 106.

The image acquiring unit 301 acquires image data to be processed from an external device (such as an imaging device). The luminance acquiring unit 304 acquires luminance information from the image data acquired by the image acquiring unit 301. The image output unit 105 performs a process of outputting an uncombined image acquired by the image acquiring unit 301 or a combined image generated by the image combining unit 102.

The control unit 106 controls the image acquiring unit 301, the image combining unit 102, and the image output unit 105 on the basis of outside information acquired by the outside information acquiring unit 103 and luminance information acquired by the luminance acquiring unit 304.

Figure 12:
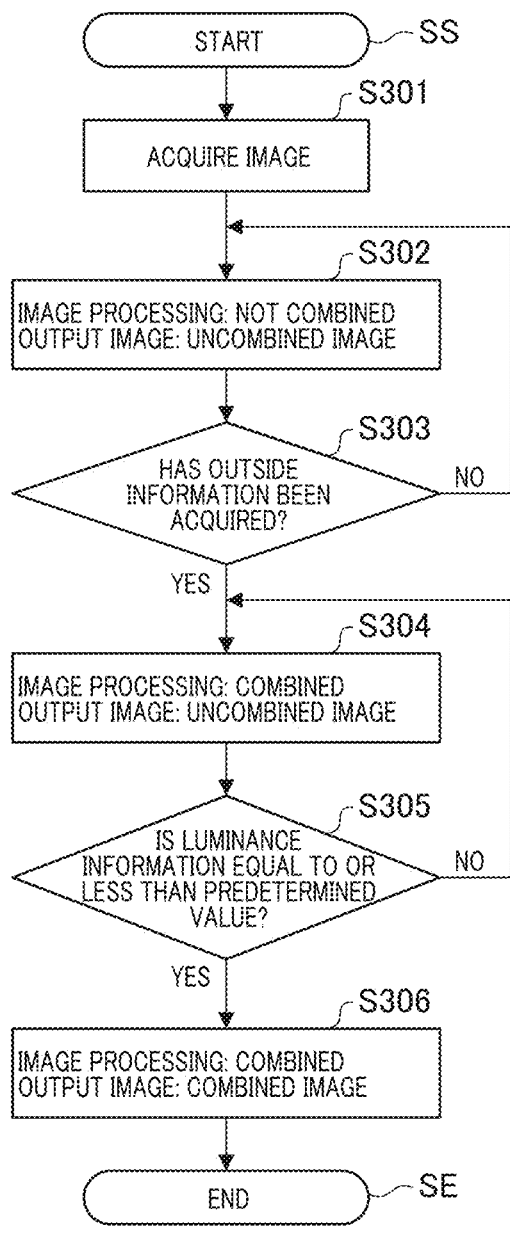
FIG. 12 is a flowchart illustrating a process flow according to the third embodiment.

FIG. 12 is a flowchart illustrating a process flow according to this embodiment. In S301, the image acquiring unit 301 starts acquisition of image data. Then, in S302, the image combining unit 102 does not perform the process of generating a combined image, and the image output unit 105 performs the process of outputting an uncombined image acquired by the image acquiring unit 301. Then, the process flow proceeds to S303.

In S303, the control unit 106 determines whether the outside information acquiring unit 103 has acquired first outside information. When it is determined that the outside information acquiring unit 103 has acquired first outside information, the process flow proceeds to S304. When it is determined that the outside information acquiring unit 103 has not acquired first outside information, the process flow proceeds to S302.

In S304, the image combining unit 102 performs the process of generating a combined image, and the image output unit 105 performs the process of outputting an uncombined image acquired by the image acquiring unit 301. Then, in S305, the control unit 106 compares a value of luminance information acquired by the luminance acquiring unit 304 with a predetermined value (a first threshold value). When it is determined that the value of luminance information is equal to or less than the predetermined value, the process flow proceeds to S306. When it is determined that the value of luminance information is greater than the predetermined value, the process flow proceeds to S304.

In S306, the image combining unit 102 performs the process of generating a combined image, and the image output unit 105 performs the process of outputting the combined image. The output process is performed with switching from an uncombined image output by the image output unit 105 to a combined image generated by the image combining unit 102 in S304.

In this embodiment, the process of generating a combined image is started, for example, at a time point at which outside information for identifying that a vehicle is in the vicinity of an entrance of a tunnel has been acquired. It is possible to output a combined image without a delay from a time point at which luminance information is equal to or less than the predetermined value and it is determined that a vehicle has entered a tunnel.

According to this embodiment, it is possible to provide an image processing device that can output a combined image without a delay with respect to a change in luminance by employing a configuration for acquiring image data from an external device.

The image processing device 300 has a configuration in which the image acquiring unit 301 acquires image data from an external device instead of causing the imaging unit 101 to perform imaging. The image processing device 300 includes the luminance acquiring unit 304 instead of the photometry unit. Without measuring luminance of an imaging target, the image acquiring unit 301 can acquire luminance information from image data acquired by the image acquiring unit 301.

In this regard, the configurations or methods described in the first embodiment, the second embodiment, and the modified examples are applicable by replacing the imaging unit with the image acquiring unit in the third embodiment and replacing the photometry unit with the luminance acquiring unit.

According to this embodiment, it is possible to provide an imaging device and an image processing device that can more rapidly output a recognizable image with respect to a change in luminance.

Other Embodiments

The present invention can be realized through a process of supplying a program for realizing one or more functions of the aforementioned embodiments to a system or a device via a network or a storage medium and causing one or more processors in a computer of the system or the device to read and execute the program. The one or more functions can be realized by a circuit (for example, an ASIC).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A movable apparatus including an imaging unit and an image processing device comprising:

a memory storing instructions; and a processor executing the instructions causing the image processing device to:

acquire outside information including a position information of the movable apparatus;

acquire luminance information of an imaging area associated with the imaging unit;

combine a plurality of images acquired by the imaging unit and to generate a first combined image;

combine a plurality of images acquired by the imaging unit and to generate a second combined image;

wherein a number of combined images to generate the second combined image is larger than a number of combined images to generate the first combined image, (Note: para [0064])

perform a process of outputting the acquired image or the combined image to a display device; and display the first combined image by the display device without generating the second combined image before a position where the movable apparatus approaches an entrance of a tunnel based on the position information of the movable apparatus, start generating the second combined image while continuing displaying the first combined image after the movable apparatus passes the position corresponding to the entrance of the tunnel, then, in a case where a value of the luminance information becomes equal to or less than a predetermined value, switch displaying of the display device from the first combined image to the second combined image.

2. The movable apparatus according to claim 1, wherein the processor is further configured to perform the process of generating the first combined image, not to perform the process of generating the second combined image, and to perform the process of outputting the first combined image when the value of the luminance information is equal to or greater than a threshold value.

3. The movable apparatus according to claim 1, wherein the processor is further configured to start the process of generating the first combined image when the processor newly acquires the outside information after having performed the process of outputting the second combined image and having stopped the process of generating the first combined image.

4. The movable apparatus according to claim 3, wherein the processor is further configured to stop the process of generating the second combined image and perform the process of switching from the second combined image to the first combined image and outputting the first combined image when the processor starts the process of generating the first combined image and the value of the luminance information is equal or greater than the threshold value.

5. An image processing method that is performed by an image processing device included in a movable apparatus for processing a plurality of images, the image processing method comprising:

acquiring outside information including a position information of the movable apparatus;

acquiring luminance information of an imaging area associated with an imaging unit included in the movable apparatus;

combining the plurality of images acquired by the imaging unit to generate a first combined image;

combine a plurality of images acquired by the imaging unit and to generate a second combined image;

wherein a number of combined images to generate the second combined image is larger than a number of combined images to generate the first combined image, performing a process of outputting the acquired image or the combined image to a display device, display the first combined image by the display device without generating the second combined image before a position where the movable apparatus approaches an entrance of a tunnel based on the position information of the movable apparatus, start generating the second combined image while continuing displaying the first combined image after the movable apparatus passes the position corresponding to the entrance of the tunnel, and then, in a case where a value of the luminance information becomes equal to or less than a predetermined value, switch displaying of the display device from the first combined image to the second combined image.

6. A non-transitory computer-readable storage medium configured to store a computer program for controlling a movable apparatus, wherein the computer program comprising instructions for executing following processes:

acquiring outside information including a position information of the movable apparatus;

acquiring luminance information of an image imaging area associated with an imaging unit included in the movable apparatus;

combining the plurality of images acquired by the imaging unit to generate a first combined image;

combine a plurality of images acquired by the imaging unit and to generate a second combined image;

wherein a number of combined images to generate the second combined image is larger than a number of combined images to generate the first combined image, performing a process of outputting the acquired image or the combined image to a display device, display the first combined image by the display device without generating the second combined image before a position where the movable apparatus approaches an entrance of a tunnel based on the position information of the movable apparatus, start generating the second combined image while continuing displaying the first combined image after the movable apparatus passes the position corresponding to the entrance of the tunnel, and then, in a case where a value of the luminance information becomes equal to or less than a predetermined value, switch displaying of the display device from the first combined image to the second combined image.

* * * * *